Jan. 5, 1932.  G. L. DANNEHOWER  1,839,378
WOODWORKING MACHINE
Filed Sept. 26, 1928   2 Sheets-Sheet 2

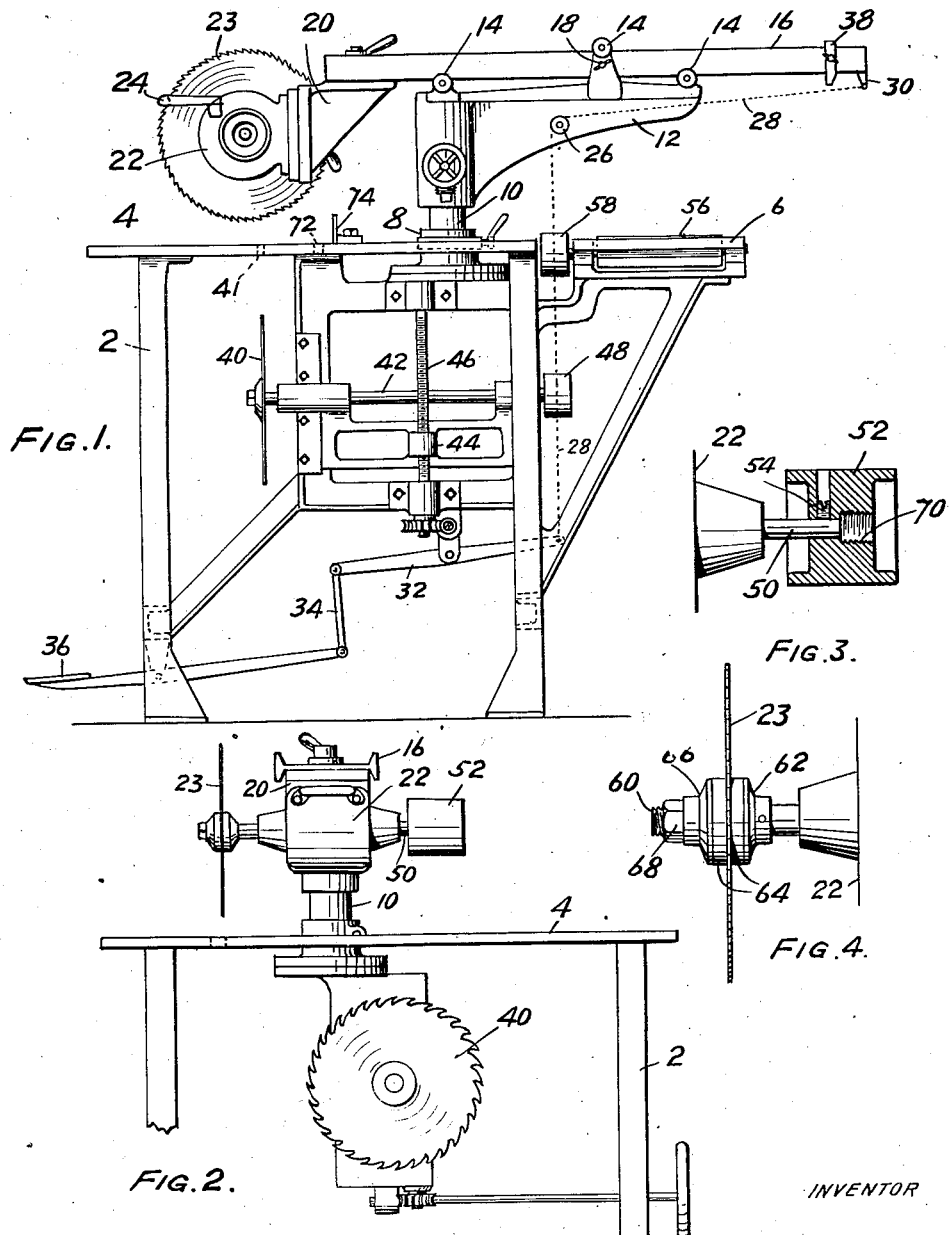

WITNESS:

INVENTOR
Gilbert L. Dannehower
BY
ATTORNEYS.

Patented Jan. 5, 1932

1,839,378

UNITED STATES PATENT OFFICE

GILBERT L. DANNEHOWER, OF NORRISTOWN, PENNSYLVANIA, ASSIGNOR TO WOOD-WORKING MACHINERY COMPANY, OF PHILADELPHIA, PENNSYLVANIA

WOODWORKING MACHINE

Application filed September 26, 1928. Serial No. 308,407.

This invention relates to improvements in woodworking machines and more particularly to a unitary machine comprising several tools arranged to provide a simple and efficient means for performing a great variety of operations. The primary tool in this machine is a sliding saw and one feature of the invention relates to the driving of other tools by the motor which drives said saw.

Heretofore woodworking machines have been designed having in a unitary structure a motor driven sliding saw, a rip saw, and jointer, which latter tools have been driven from the motor through a single belt. In the constructions referred to, the sliding support carrying the motor is held in fixed position and a belt is trained about a pulley thereon and a pulley on the rip saw shaft. The outer face of this belt contacts with a pulley carried by the jointer to drive the latter in a direction opposite the rip saw. Because in such construction the area of contact between the jointer pulley and belt is necessarily small, since simplicity of construction is necessary to make the machine practical, the jointer drive is unsatisfactory because of slipage.

Accordingly, one object of the present invention is the provision of a drive for a jointer from a sliding saw motor which is free from the objections noted. Other more detailed objects relate to the provisions of specific means for accomplishing the main object as will be more apparent hereafter.

Another object of the invention is the provision of a pedal means for actuating the sliding saw.

A further object is the provision of means for simultaneously producing a plurality of ripping cuts.

Other objects will become apparent when the following description is read in connection with the accompanying drawings, in which:

Fig. 1 is a side elevation of the improved machine;

Fig. 2 is a fragmentary front elevation thereof;

Fig. 3 is a sectional view showing the details of the driving pulley;

Fig. 4 is an elevation showing the cross-cut saw securing means;

Figure 5:
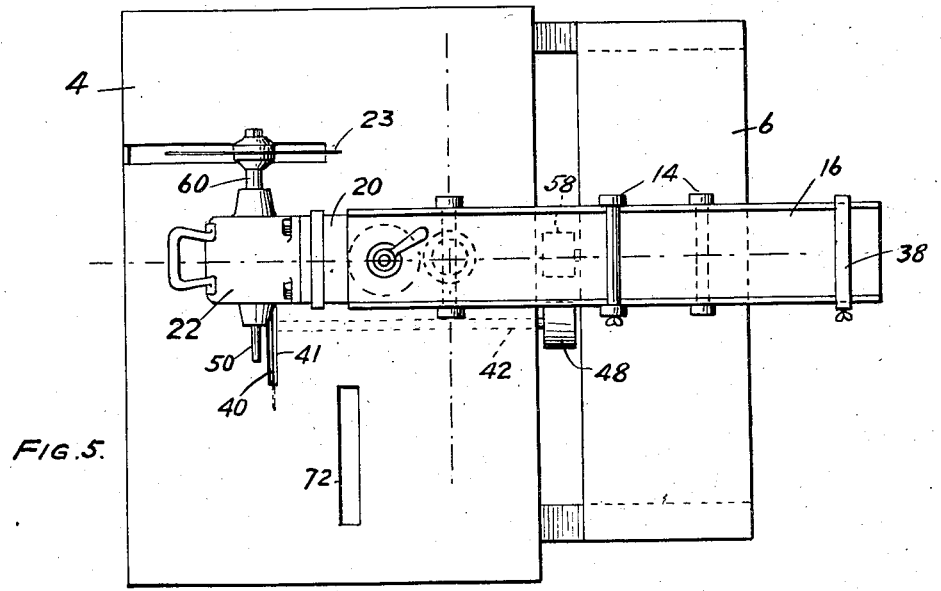
Fig. 5 is a plan view of the machine.

The machine of the present invention consists of a frame 2 which supports the operating parts and which carries saw table 4 and jointer table 6. A sliding saw is mounted for movement over the saw table, this saw being of the construction shown in the application of Louis N. McCarter, Serial No. 256,828, filed February 25, 1928, to which reference may be made for details of construction. As shown in that application, a pedestal 8 is provided, being in the present construction carried by the frame, in which pedestal is rotatably mounted a post 10, securable against rotary movement by a clamping means. On post 10 is mounted a vertically adjustable bracket 12 carrying three rollers 14 having ball bearing or other anti-friction mountings, and which form bearings for a sliding I-beam 16, which may be held against sliding by a wing nut 18 or the equivalent. Secured to the forward end of the slide for adjustment about a vertical axis is a bracket 20 while secured to bracket 20 for adjustment about a horizontal axis is a motor 22 on the shaft of which is carried a saw 23. Longitudinal motion may be imparted to the slide through a handle 24 arranged to be gripped by an operator.

Since it is desirable to permit an operator to have both hands free to properly manipulate the work a pedal operated means is provided for operating the slide. In the machines heretofore made, the slide generally consisted of rods slidable through guiding apertures in the stationary frame. As a result frictional forces were comparatively large. The resistance to sliding motion was further increased because in these machines the motor was mounted at the rear of the slide, the saw being driven by means of a belt trained about the motor pulley and a pulley on the saw spindle. If this belt was tightened to insure a positive drive of the saw, the rods forming the slide would be bent sufficiently to produce binding in the guiding apertures. As a consequence, since considerable effort was required to move the slide, it was necessary to use the hand to produce an even movement thereof and practical pedal operation was impossible.

On the other hand, by reason of the antifriction triple-point mounting of the slide disclosed in the Louis N. McCarter application referred to above it is found that pedal operation of that sliding saw is not only feasible but very advantageous since that saw readily lends itself to pedal connection. In a preferred application of pedal operation to that saw, a pulley 26 is mounted in bracket 12, about which is trained a cable or wire or other flexible member 28, detachably secured to the rear of the slide as at 30. The lower end of this cable is secured to the rear end of a lever 32 pivoted to the frame and connected by a link 34 to the rear end of a pedal lever 36. As will be obvious, depression of pedal 36 moves the slide forwardly on its cutting stroke. Movement to restore the slide to its rearward position may be accomplished manually and is preferably so accomplished although it will be clear that a spring or weight may be provided to accomplish such restoration automatically. By reason of the flexible connection the pedal operation is not interfered with if the post 10 is revolved to enable angular cross cuts to be made. A stop 38 is provided to limit the forward movement of the saw. Since the flexible member 28 is detachably secured to the slide, it may be readily removed therefrom when the slide is moved into the positions indicated in Fig. 6.

A rip saw 40 adapted to project through a slot 41 in the saw table is carried by a shaft 42 mounted in the usual manner in a slide 44 vertically adjustable by rotation of screw 46 through a suitable hand wheel and connections. On the end of shaft 42 opposite saw 40 and in vertical alignment with the space between tables 4 and 6 is a pulley 48.

The end of the motor shaft opposite saw 23 is formed as a spindle 50 adapted to enter a hole within pulley 52 which is fixedly secured thereon by a set screw 54 threaded therein and engaging a flat portion of the spindle. When the slide is locked in the position illustrated in full lines in Fig. 6, pulley 52 lies in the vertical plane transverse to pulley 48 and saw 40 may be driven from the motor 22 by means of a suitable belt 55.

Mounted to rotate about a horizontal axis extending transversely of table 6, and extending upwardly through an opening therein, is a jointer 56 to the shaft of which is secured a pulley 58 also in vertical alignment with the opening between tables 4 and 6. Since a right hand operation is provided in the machine for all the tools, jointer 56 must be driven in a direction opposite that of saw 40. To secure such result without the use of a crossed belt and to insure positive drive of the jointer as compared with the unreliable drive heretofore obtained, arrangement is made to drive the jointer from the motor turned through 180° from its position when driving the rip saw.

The end 60 of the motor shaft adapted to carry the cross-cut saw is screw threaded in the ordinary manner, being provided with a fixed washer 62 outside of which are located spacers 64 having the saw 23 located between them, the parts being held together by a suitable washer 66 and nut 68 threaded on the shaft. To provide a simple interchange of parts, pulley 52 is threaded internally as indicated at 70 so that it may be threaded on end 60 of the motor shaft. With the slide then locked in the position indicated in dotted lines in Fig. 6, pulley 52 will be aligned with pulley 58 so that the latter may be driven from the former through a belt 71 which, of course, may be the same belt indicated at 55.

By the above construction it will be observed that there is provided a positive drive for the jointer from an irreversible motor without the use of a crossed belt, gearing, or any elaborate mechanism.

Figure 6:
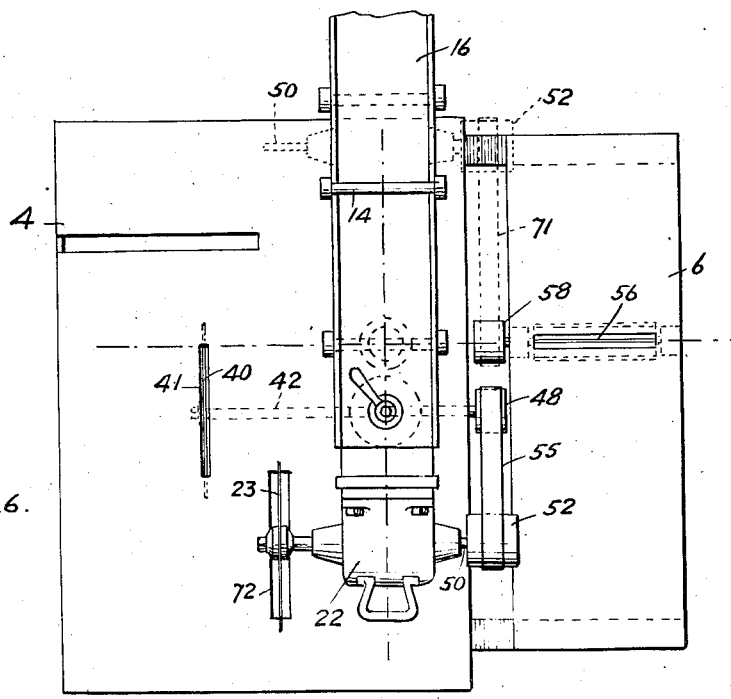
Fig. 6 is a similar plan view showing the parts arranged in different positions.

A slot 72 is formed in table 4 so as to lie below saw 23 when the saw is in the position shown in Fig. 6 driving pulley 48 and saw 40. By raising saw 40 so as to cause it to project above table 4 and by lowering saw 23 into slot 72 two simultaneous cuts may be made in a board guided against adjustable fence 74, the distance between the cuts being adjusted by the use of suitable spacers 64 in mounting saw 23.

While saws and a jointer have been particularly referred to throughout the description, it is clear that similar cutting instruments, for example, dado heads, could be substituted or used in combination with the other tools while retaining the advantages of the present invention. Accordingly the terms used in the claims are intended to include such equivalents.

What I claim and desire to protect by Letters Patent is:

In a woodworking machine, a supporting frame, a plurality of rotary tools carried by the frame mounted for rotation in opposite directions about parallel axes, pulleys connected to said tools, a slide, supporting means mounting the slide for reciprocating movement over the table, said supporting means being adjustable to provide an adjustment of the slide about a vertical axis, a motor carried by the slide having a shaft projecting from opposite sides thereof, said supporting means being adjustable into one position wherein one end of the shaft is in alignment with one of said pulleys, and into a second position wherein the other end of the shaft is in alignment with the other of said pulleys, a saw adapted to be secured to one end of the shaft, and a pulley adapted to be secured either to the last named end of the shaft to replace the saw or to the other end of the shaft whereby it is adapted to drive through a belt either of the pulleys with which the end of the shaft carrying it is in alignment.

In testimony of which invention, I have hereunto set my hand at Philadelphia, Pennsylvania, on this 22nd day of September 1928.

GILBERT L. DANNEHOWER.